April 4, 1961 E. F. BROWN 2,978,535

OPTIMAL RUN LENGTH CODING OF IMAGE SIGNALS

Filed Jan. 28, 1960 3 Sheets-Sheet 1

INVENTOR
E. F. BROWN
BY Harry C. Hart
ATTORNEY

April 4, 1961 E. F. BROWN 2,978,535

OPTIMAL RUN LENGTH CODING OF IMAGE SIGNALS

Filed Jan. 28, 1960

3 Sheets-Sheet 2

INVENTOR
E. F. BROWN
BY Harry C. Hart
ATTORNEY

April 4, 1961 E. F. BROWN 2,978,535

OPTIMAL RUN LENGTH CODING OF IMAGE SIGNALS

Filed Jan. 28, 1960 3 Sheets-Sheet 3

(OUTPUT OF COUNTER 40)

INVENTOR
E. F. BROWN
BY Harry C. Hart
ATTORNEY 2,978,535

OPTIMAL RUN LENGTH CODING OF IMAGE SIGNALS

Earl F. Brown, New Brunswick, N.J., assignor to Bell Telephone Laboratories, Incorporated, New York, N.Y., a corporation of New York Filed Jan. 28, 1960, Ser. No. 5,280

9 Claims. (Cl. 178—6)

This invention deals with the generation of image signals in pulse code form, with the transmission of such signals by pulse code techniques, and with the reconstruction of images from received pulse code signals. Its object is to improve the efficiency with which image signals are coded and thus, for any particular transmission medium, to reduce the total number of pulses required for the reproduction of an image.

Unlike voice signals, which originate in the human vocal tract and consequently have very similar characteristics, vision signals, having no such common origin, are of widely varying characteristics. Scenes such as a dance, a tennis match, or the like, require to be scanned on a point-for-point basis, and the generation of a brightness signal for each point scanned. This treatment is prodigal of frequency bandwidth. The derivation of signals from an immobile black-and-white scene, e.g., printed matter, is much less demanding. The same holds, to a considerable extent, of a vision signal which merely supplements an ordinary telephone conversation with which it is coordinated. The scene represented by the supplemental vision signal consists, for the most part, of the face of the speaker against the walls of his office as a background. Movement of objects in the background is rare, and movements of the face of the speaker are generally slow. Accordingly, the scanning of such a scene on a point-for-point basis, and the generation of a brightness signal for each point scanned are wasteful. The situation calls, rather, for variable speed scanning, both at transmitter and receiver, for coordination of scanning speeds on a start-stop basis, and for the utilization of the natural sampling principle: i.e., the generation of a vision signal when and only when a transition takes place in the brightness of the scene that is in excess of a preassigned threshold. With scenes of the sort here considered this technique makes for substantial economies in bandwidth.

It has long been recognized that substantial economies can be effected, in the transmission of subject matter characterized by abrupt transitions of light value or "tone," and comparatively small tone variations between transitions, by coding and transmitting the tone following each transition and the distance, usually the length measured along a scanning line, separating it from the preceding transition. This technique, termed "run-length coding," is in contrast to the normal one of coding the tone of each picture element as it is encountered in the scanning process and transmitting the codes in regular temporal sequence. When the scene or subject matter being scanned contains a "run" of a large number of successive picture elements of like tone the normal technique results in the sequential transmission of an equally large number of like code pulse groups that occupy time and require frequency bandwidth for their transmission. At the price of coding transition locations in addition to tones, the run-length coding technique eliminates many of the repetitions of the tone code. Because no coding or decoding apparatus, no matter how complex, is completely unlimited in its scope, the instrumentation of a run-length coding system is naturally carried out on the basis of a preassigned maximum length of run, e.g., thirty-two successive picture elements. The location of a transition within a run of this length can be unambgiuously expressed in a code of five two-valued digits: $2^5=32$. The coding of a run containing no transitions at all, i.e., a full-length "empty" run, is then carried out on exactly the same basis as the coding of any shorter run, namely by generating and transmitting the code pulse counterpart of the full length of the run, measured in picture element units, i.e., the number of picture elements constituting a run of maximum length, together with the code representation of the tone value at the beginning of the run.

The present invention stems from the recognition that, by modification of the limited run-length coding technique, the total number of pulses required to define the vision signal can be further reduced. With such modification, the greater the maximum length of run and the more frequent the occurrences of empty runs, the greater the reduction in the total number of pulses and the greater the resulting economy. The modification by which this result is secured can be simply expressed as follows: Instead of coding the numerical length of each empty run and the tone value that has remained unchanged throughout the run, code merely the fact of each empty run; for this can be done with a single digit. In other words, the empty runs are merely counted, only transitions being coded, both as to their locations and as to their tone values.

Investigation of the economies to be secured in this fashion leads to a simple algebraic expression for the total number of pulses required to specify the locations of all the transitions of tone in the scene, in dependence on the maximum run length employed. It turns out, too, that there exists an optimum value for the maximum run length, in dependence on the density with which transitions of tone occur within the subject matter or scene being transmitted. These optima are discrete: the optimum run lengths are 2, 4, 8, 16 . . . $2^n$ picture elements or "dots" when binary code is to be employed, and these optima correspond to average transition densities of 30, 15, 7.5, 3.75 . . . percent, respectively. Similarly, if ternary coding is to be employed, the optimum run lengths are 3, 9, 27, 81 . . . $3^n$ dots, and, in general, for N-ary coding, they are $r^1$, $r^2$, $r^3$ . . . $r^n$ dots, where $r$ stands for the radix of the code. Each of these optima corresponds to an average transition density within a certain range. Because those for the binary code lie closer together than do the others, this code makes for greater flexibility in the matching of maximum run length to the characetr of the scene or subject being transmitted.

The invention will be fully apprehended from the following description of a preferred embodiment thereof taken in connection with the appended drawings in which.

These figures are not actual circuit diagrams. Rather, each of them is a single line layout, each line indicating a transmission path or a control path. The system requires a number of switching or gating operations. The apparatus for performing these operations is shown, in most cases, by a group of three arrowheads arranged in one or another of two different ways. In each case the two arrowheads that point toward each other define a transmission path, to be established or disestablished by a control signal applied to a third arrowhead shown pointing toward the first two arrowheads. When the path is normally disestablished, to be established by a control signal, the first two arrowheads are shown spaced apart and the third control arrowhead is shown in outline. When, to the contrary, the transmission path is normally established, to be disestablished by a control signal, the first two arrowheads are shown in mutual contact and the third arrowhead is shown in solid black.

Figure 1:
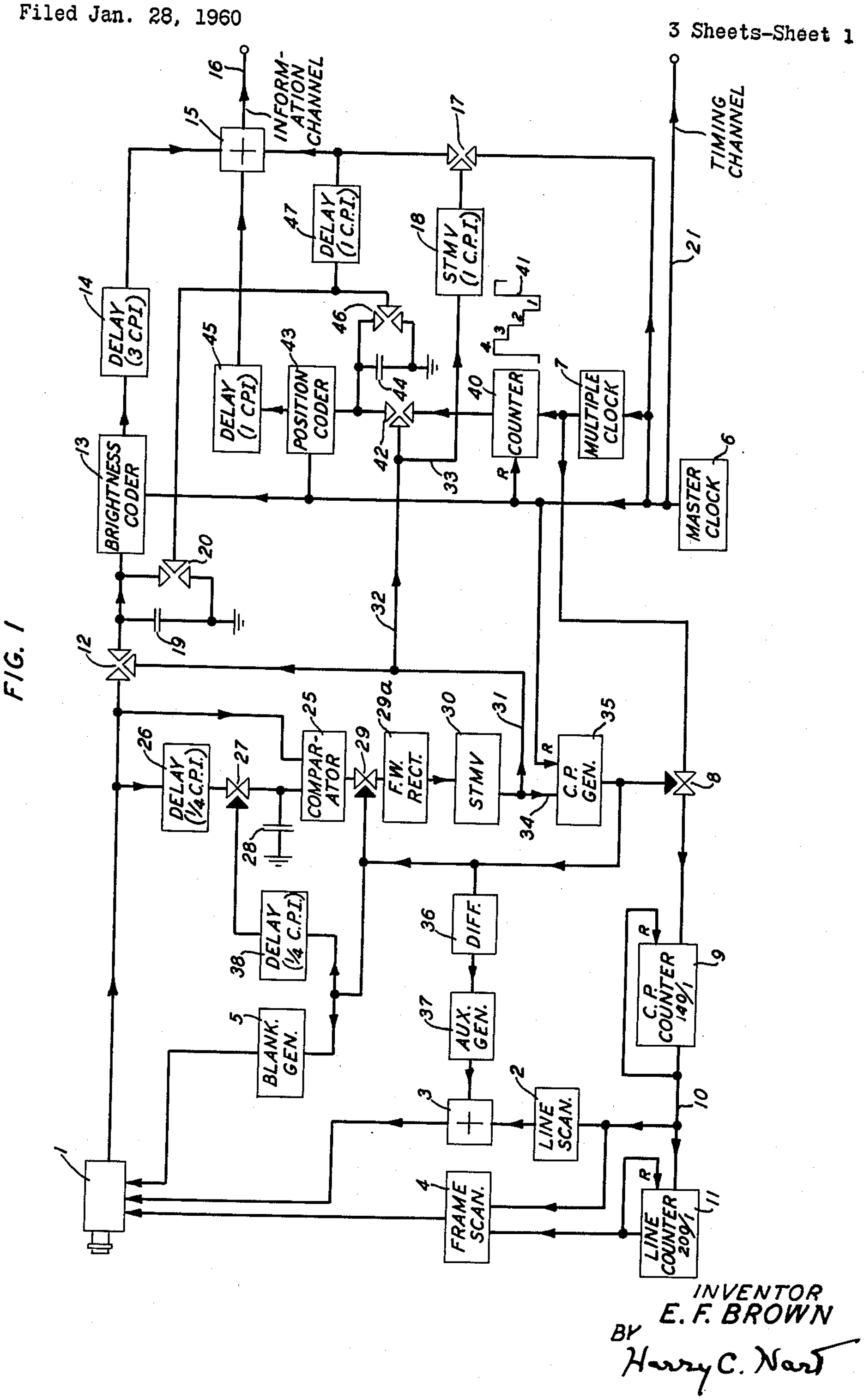
Fig. 1 is a schematic block diagram showing transmitter apparatus embodying the invention.

Referring now to the drawings, Fig. 1 is a block schematic diagram showing run-length coding apparatus embodying the invention.

The image signal to be transmitted may originate in a camera tube 1 having provision for causing a pickup beam to scan a two-dimensional electrostatic image of a scene to be transmitted, preferably line by line, under control of a line scan generator whose output is applied through an adder 3 to the horizontal deflection elements of the tube 1, and a frame scan generator 4 whose output is applied to the vertical deflection elements of the tube. For reasons to be described below the tube 1 is also provided with a control electrode for obliterating or blanking its electron beam, and the output of a blanking generator 5, controlled as described below, is applied to this electrode.

In accordance with the invention, the timing of the apparatus is under the joint control of two "clocks," the rate of one of which, termed a "Multiple" clock, is an integral multiple of the rate of the other, termed the "Master" clock, these multiples being one of the numbers 2, 4, 8 . . . $2^n$ or 3, 9, 27 . . . $3^n$ or, in general, $r^1, r^2, r^3 \ldots r^n$, in dependence on the character of the subject matter it is required to scan. In the present illustration, binary coding is employed, which restricts the multiple to one of the first set of numbers, and the signals to be transmitted are derived from scenes having a transition density ratio of about 15 percent which, as will be shown, calls for a maximum run length of four dots. Hence the clock rate ratio is four. Accordingly, for a rate R for the Master clock 6 the rate of the Multiple clock 7 is 4R.

The coding operations and the transmission of the code pulses are controlled by the Master clock 6, as described below, while the scanning operations, instrumented in the left-hand part of the figure, are controlled by the Multiple clock 7. Its pulses pass through a normally enabled clock gate 8 to a clock pulse counter 9 which counts a number of multiple clock pulses equal to the maximum number of discernably different picture elements which can be encountered in the scanning of a single line of the scene, e.g., 140 of them and, upon conclusion of its count, resets itself and delivers an output pulse on a conductor 10. This output pulse serves to trip the line scan generator 2 which delivers a sawtooth wave of appropriate rise rate, peak amplitude and abrupt return with each control pulse applied to it. The output of the line scan generator 2 may have pauses introduced into it in the manner described below. With or without such pauses it is applied to the horizontal deflection elements of the camera tube 1 to control the lateral movements of the scanning beam.

The output of the clock pulse counter 9 is also applied to a line counter 11 whose construction may be similar to that of the clock pulse counter 9 but is proportioned to count the pulses applied to it up to the number of different scanning lines from which the image of the transmitted scene is to be reproduced, for example 200. Upon the completion of its count it resets itself and delivers an output pulse to one input point of the frame scan generator constructed to deliver an output wave having the form of a staircase of a precisely determined number of steps, all alike in height, one for each scanning line. The width of each "tread" of the staircase is determined by the interval between successive output pulses of the clock pulse counter 9 delivered to a second input point of the frame scan generator 4 and this, in turn, depends on the number of occasions during the scanning of a single line on which Multiple clock pulses are blocked by the clock gate 8.

Passing, for the present, the controls for the sampling operations, the output of the camera tube 1 is applied to a signal gate 12 and, when the conduction path through this gate is established by a control signal applied to its control terminal, the output of the camera tube passes through the gate 12 to the input terminal of a coder 13 which converts it into a permutation code group of pulses. This coder is enabled once for each output pulse of the Master clock 6. The code pulse group that results from the coding operation is now delayed by three Master clock pulse intervals by a delay device 14 and delivered through an adder 15 to an outgoing line 16. The code pulse group is preceded by a marker pulse derived from the Master clock 6 and passed through the adder 15 to the outgoing line 16 through a marker gate 17 under control of the output of a single-trip multivibrator 18. By appropriate adjustment of the time constant of this multivibrator its output pulse endures for a single Master clock pulse interval. In addition, each signal sample that passes the gate 12 is held on a condenser 19 for a time sufficient to allow the coder 13 to carry out its coding operation, whereupon the input to the coder is returned to zero by short-circuiting the condenser 19 to ground through a switch 20, the control of which will be described below.

The controls for the apparatus are best described in connection with a particular example in which, for illustration, it is assumed that a substantial fraction, for example the first half, of a particular scanning line in the scene being scaned is substantially devoid of detail.

Under this condition the gate 12 remains opaque to the vision signal reaching it from the camera tube 1 due to lack of any enabling pulse applied to its control terminal. Hence, during whatever time it takes to scan this portion of the scene, no vision signals are passed to the coder 13 or transmitted. During this period, however, the Master clock 6 delivers its pulses at the rate R to a narrow band timing channel 21, through which it controls the movements of the scanning elements of the image reproduction apparatus.

Suppose, now, that in its progress along the line the scanning beam of the camera tube 1 encounters an abrupt transition in the brightness or light value of the scene. The light value just beyond this transition passes to one input point of a comparator 25. The light value just short of the transition, i.e., the earlier one of the two, is delayed by one quarter of a Master clock pulse interval by a delay device 26 and thus brought into coincidence, on the time scale, with the former. This light value passes through a normally enabled switch 27 to a second input point of the comparator 25, each such light value being held on a condenser 28 until replaced by its successor.

The comparator 25 may take any of a wide variety of forms, several of which are illustrated and discussed by Millman and Taub in "Pulse and Digital Circuits" (McGraw-Hill, 1956) chapter 15. It delivers an output that is proportional to the difference between its two inputs. This difference-representing output is passed through a normally enabled switch 29, a full wave rectifier **29*a* and a shaper 30 and appears as a control signal for application by way of a conductor 31 to the control terminal of the gate 12. The shaper 30, which may be a single-trip multivibrator, is proportioned to respond when the rectified, difference-representing output of the comparator 25 exceeds a preassigned threshold, and not otherwise. Thus the path through the gate 12** is established only for significant transitions in the light value of the scene.

The same output of the shaper 30 is also applied by way of conductors 32, 33, to the input point of the single-trip multivibrator 18 whose output controls the marker gate 17 and, by way of a conductor 34, as an input signal to a control pulse generator 35 which may be a multivibrator, bistable or monostable, proportioned to rest, normally, in a first state, to respond to an input pulse by shifting to a second state, to hold the new state, if not reset, for somewhat more than ten clock pulse intervals, but to be reset to its first state by the tenth Master clock pulse to occur after its initial shift to the second state. Hereinafter, the duration of the output of the control pulse generator 35 is termed for short to occupy "ten+" Master clock pulse intervals. Its output may be in the form of a negative voltage signal. This is utilized to cause all the vision signal producing functions to pause during such time as the coding operations require. To this end it is applied to several points. First, its leading and trailing edges are converted by differentiator 36 into pulses of opposite polarities. These are applied, in succession, to the control point of an auxiliary sawtooth generator 37 thus to introduce a pause of ten+ clock pulse intervals into the line scan. This pause may be relative or absolute as preferred; i.e., the scanning beam may be brought to a dead stop or its speed may be reduced to a suitable low magnitude such that it can recover all necessary detail of the brightness transition before moving on. The introduction of the pause is effected in the following manner. The auxiliary sawtooth wave generator 37 is proportioned to deliver a single pulse of sawtooth form, of ten+ clock pulses' duration, and of polarity opposite to that of the output wave of the line scan generator 2, and to do so each time it is actuated by the differentiated output of the control pulse generator 35. Its output is combined with that of the line scan generator 2 in the adder 3. The combination of the two waves comprises a pseudostaircase wave of flat, 10+ clock-pulse treads, and sloping risers.

Next, the control pulse actuates the blanking generator 5 which extinguishes the electron beam of the camera tube 1 for the duration of the pause.

Third, by disestablishing the Multiple clock pulse path through the switch 8 for ten+ Master clock-pulse intervals (40+ pulses of the Multiple clock) it halts the advances of the clock pulse counter 9 and of the line counter 11 for the same period.

Fourth, after a delay of a quarter of a Master clock interval introduced by a delay device 38, it disestablishes the path through the switch 27, so that the vision signal amplitude representing the most recently encountered picture element is stored on the holding condenser 28, and thus continuously applied to the second input point of the comparator 25. Fifth, it breaks the path through the switch 29. This operation serves to prevent transfer to the rectifier 29*a* of an output of the comparator 25 representing a spurious transition, due to the inability of the comparator 25 to distinguish a transition from a reduction of the vision signal to zero due to the blanking of the camera tube beam during the coding operation.

When, after the completion of the coding pause of ten+ clock pulse intervals when scanning is resumed and the vision signal reappears at the output of the camera tube 1, the signal amplitude thus stored on the condenser 28 is compared with the following vision signal amplitude that appears at the first input point of the comparator 25. Thereupon the path through the switch 27 is re-established and comparison takes place between the vision signal amplitude of each picture element of the scene and that of the following one as before.

As a result of the operations of all these apparatus components, coordinated in the fashion just described, a vision signal code pulse group is passed to the outgoing line 16 after the lapse of three Master clock pulse intervals following the passage of the scanning beam of the camera tube 1 across a transition in the brightness of the scene that exceeds a preassigned threshold level determined by the sensitivity of the shaper 30 and not otherwise.

In accordance with the invention the location of each transition in the tone value of the scene is identified, as well as the tone value following the transition, and this identification is signaled to the receiver apparatus by counting off empty runs, i.e., runs of preassigned length that are devoid of transitions, and coding the location, within the most recent run, of the most recent transition. To this end the output pulses of the Multiple clock 7, four for each output pulse of the Master clock 6 are counted by a counter 40 up to the count of four, whereupon the following Master clock pulse resets the counter 40. The output of this counter, in the form of a 4-tread descending staircase wave 41 is applied to one conduction terminal of a normally disabled switch 42 that is enabled each time a significant transition in tone value in the scene is encountered in the scanning operation. The switch is enabled, by the output of the shaper 30 over the conductors 31, 32. Thus, when a tone value transition is encountered the Multiple clock pulse count registered in the counter 40 is applied to the input terminal of a position coder 43 and, at the same time, held on a condenser 44 sufficiently long to permit the coder 43 to accept and code it under control of the following output pulses of the Master clock. The count is thus converted into a permutation code pulse group by the position coder 43. With a selected run-length of four picture elements, a 2-digit code suffices. For a run-length of eight picture elements, a 3-digit code is required, and so on. The resulting position code pulse group, after being delayed by a single Master clock pulse interval by a delay device 45 so that it follows the marker pulse and precedes the brightness code pulses, is introduced through the adder 15 into the outgoing line 16.

With a counter output wave of the form 41, having amplitudes of 4, 3, 2 and 1 volts, representing the first, second, third and fourth quarters of the Master clock interval, the coder, processing these amplitudes in the usual fashion, delivers output code words 11, 10, 01, and 00, respectively, signifying the presence of a transition in the first, second, third, or fourth quarter of the Master clock pulse interval.

Figure 3:
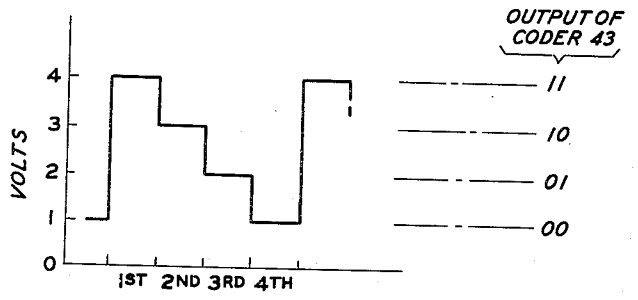
Figs. 3 and 4 are diagrams illustrating the operations of parts of the system.

Fig. 3 shows the staircase wave output 41 of the counter 40 to an enlarged scale. The duration of each of the "treads" of the stair is one Multiplier clock pulse interval, i.e., one quarter of a Master clock pulse interval. The voltage levels of the successive treads are shown as 4 volts, 3 volts, 2 volts, and 1 volt, respectively. Application of these voltages to a binary coder constructed in the conventional fashion gives rise to code words of the form shown in the right-hand portion of the figure, each "1" corresponding to a pulse and each "0" corresponding to a space.

The Multiple clock pulse count stored on the holding condenser 44 is removed by short-circuiting this condenser to ground through a switch 46 under the influence of the marker pulse, delayed by a single clock pulse interval by a delay device 47. The same delayed marker pulse, by establishing the conduction path through the switch 20, operates to discharge the condenser 19, thus returning the brightness signal input to the coder 13 to zero, as described above.

As a result of the foregoing operations the train of pulses representing each transition consists of a marker pulse that designates the fact that a transition has been encountered, followed by a 2-digit position code pulse group followed, in turn, by a 7-digit brightness code pulse group. The brightness code pulse group informs the receiver apparatus of the tone value following the transition and the position code pulse group informs it as to whether the transition is encountered in the first, the second, the third or the fourth quarter of the most recent run. In the absence of transitions the outgoing line carries no pulses at all, and the only information passed to the receiver is the sequence of Master clock pulses transmitted over the timing channel 21.

The reason for the selection of "10+" Master clock pulse intervals as the duration of the pulse output of the control pulse generator 35 will now be apparent. This output pulse commences at a random or variable instant between any particular Master clock pulse and the following Master clock pulse in dependence on just where, within a scanning line, the brightness transition responsible for this event occurs. In other words, to within the accuracy of a single Multiple clock pulse, the brightness transition and hence the inception of the control generator pulse may occur in the first, the second, the third or the fourth quarter of the current Master clock pulse interval. Inasmuch as the duration of this control pulse must be such as to permit the completion of the operations of coding the position of the transition, coding its light value, and interposing a marker pulse ahead of the two code words the output of the control pulse generator must endure until the ninth Master clock pulse following the next one to arrive. In other words, it must endure at the least, for ten Master clock pulse intervals but may in fact be required to endure for as much as 10¾ Master clock pulse intervals in the particular example shown. This duration, of some particular number of Master clock pulse intervals plus a certain fraction of a single Master clock pulse interval in dependence on the length chosen for the empty run, is conveniently designated $10^+$ Master clock pulse intervals. By the same token, a shorthand notation "$40^+$" Multiple clock pulse intervals is to be taken to means 40, 41, 42 or 43 Multiple clock pulse intervals as required in dependence on the location of the transition being coded.

Figure 2:
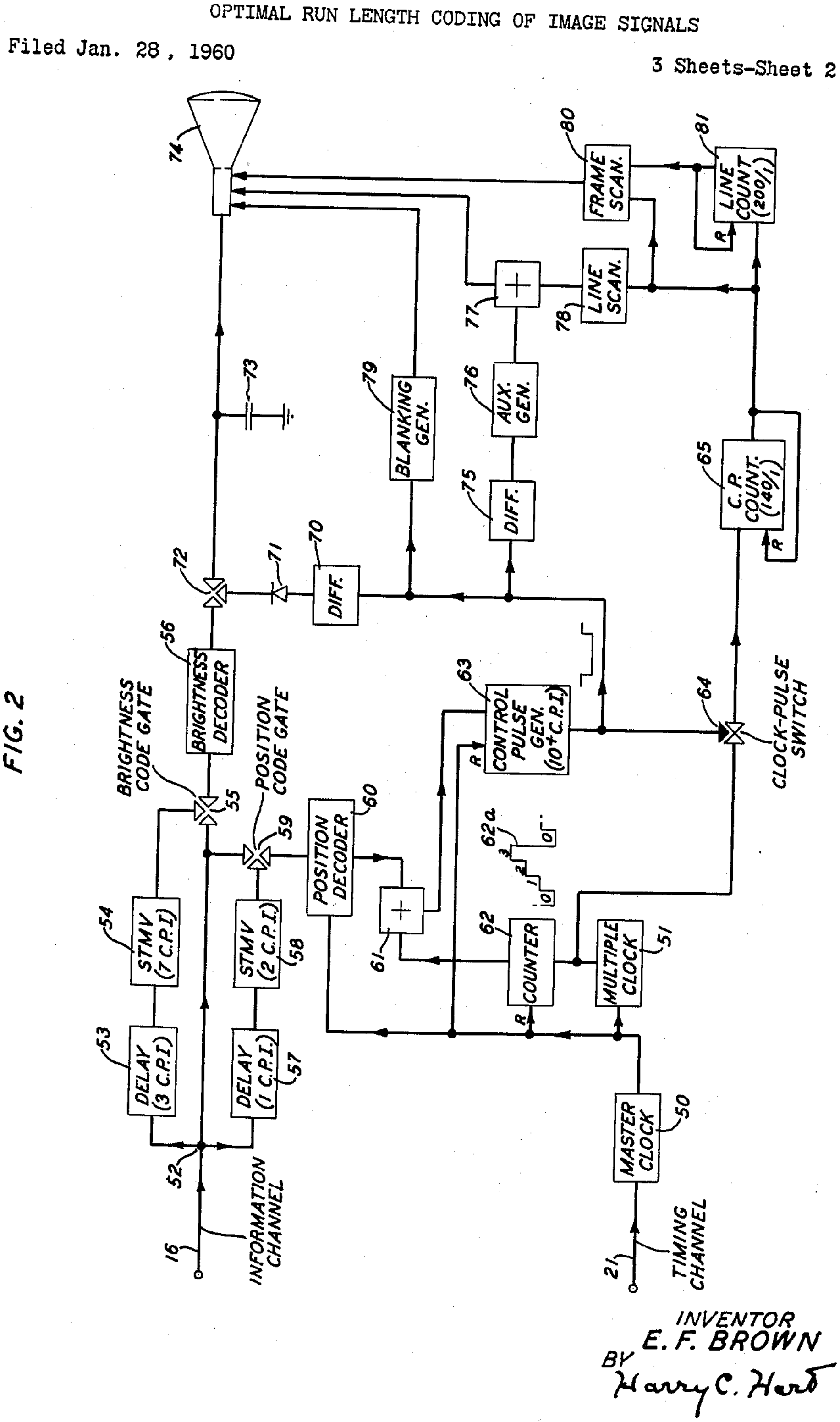
Fig. 2 is a schematic block diagram showing receiver apparatus embodying the invention.

Turning now to Fig. 2, the timing of the operations of the receiver apparatus here shown are under the joint control of a Master clock 50 and a Multiple clock 51 which are maintained in synchronism with the Master clock 6 and the Multiple clock 7, respectively, at the transmitter. The maintenance of such synchronism is secured by the pulses received over the timing path 21 that interconnects the two Master clocks and by phase locking of the Multiple clock 51 with the Master clock 50.

The train of information-carrying pulses as developed by the apparatus of Fig. 1 arrives by way of the main transmission path 16 at an intersection point 52. Here, after the lapse of three Master clock pulse intervals interposed by a delay device 53, the first pulse of each group to arrive, namely, the marker pulse, operates to trip a single-trip multivibrator 54 from one of two conditions to the other. By adjustment of its time constant it is proportioned to return to the first condition after the lapse of seven Master clock pulses. During this 7-clock-pulse interval it establishes a path from the intersection point 52 through a switch 55 to a brightness decoder 56. Because of the delay interposed by the delay device 53 the marker pulse and the position code pulses are prevented from reaching the brightness decoder 56. Hence the pulses that in fact reach the brightness decoder 56 are all representative of the amplitude of the vision signal immediately following a transition.

At the same time, the marker pulse arriving at the junction point 52 is applied, after a delay of a single Master clock pulse interval introduced by a delay device 57, to trip a single-trip multivibrator 58 from its rest condition to a different condition. This unit is proportioned to deliver on its output conductor a signal which endures for two Master clock pulse intervals, and thereupon to return to its rest condition. Application of this signal to the control terminal of a normally disabled position code switch 59 acts to establish a path from the junction point 52 to a position decoder 60 during, and only during, the second and third intervals of the incoming train.

Figure 4:
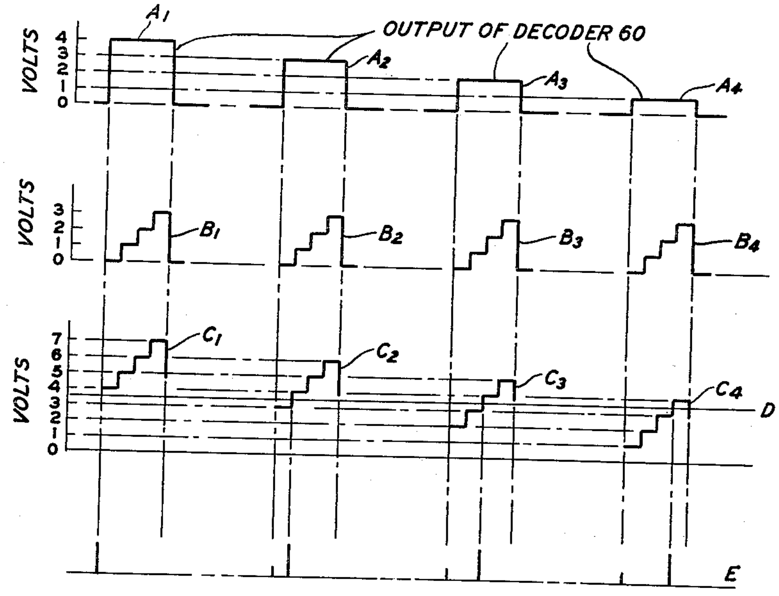

The position decoder 60 is enabled once for each pulse of the Master clock 50. It is constructed to convert the incoming position code pulse group into a pulse whose amplitude is representative of the run fraction in which the transition being decoded appears; i.e., its amplitude may be 4 volts, 3 volts, 2 volts or 1 volt, always enduring for an entire Master clock interval, according as the incoming pulse code word is 11, 10, 01 or 00, representing the presence of a light value transition in the first, the second, the third, or the fourth quarter of the current Master clock interval. These output voltages of the position decoder are shown as blocks $A_1$, $A_2$, $A_3$ and $A_4$ of Fig. 4. They are combined in an adder 61 with the output wave 62a of a counter 62 that counts the pulses of the Multiple clock 51, up to four, being then reset by the next pulse of the Master clock 50 and delivers, for each count of four, the ascending staircase wave 62a whose voltage levels may be, for example, 0 volt, 1 volt, 2 volts and 3 volts, respectively. Such staircase waves are shown as $B_1$, $B_2$, $B_3$, and $B_4$ of Fig. 4, and the combined outputs of the decoder 60 and the counter 62, shown as curves $C_1$, $C_2$, $C_3$ and $C_4$ in Fig. 4, thus crosses a 3½ volt threshold D in the first, the second, the third, or the fourth quarter of the current Master clock pulse interval that includes the transition in process of being decoded and reconstructed. It acts to trip a control pulse generator 63, which again may be a single-trip multivibrator, from its rest condition to a different condition. This unit is proportioned to have a tripping threshold of 3½ volts and to deliver, on its output conductor, a signal which endures for slightly more than ten Master clock pulse intervals, and thereupon to be "reset" to its rest condition by the Master clock pulse that next follows. The onset of each such control pulse generator output condition is indicated at E in Fig. 4. Application of the output of the control pulse generator 63 to the control terminal of a normally enabled clock switch 64 acts to disable the path from the Multiple clock 51 to a clock pulse counter 65 and thus introduces a pause in the operation of this counter which endures for $40^+$ Multiple clock pulse intervals.

A differentiator 70 converts the output of the control pulse generator into a pair of sharp, brief pulses, a negative one coinciding with the leading edge and a positive one coinciding with the trailing edge. A rectifier 71 blocks the initial negative pulse and passes the terminal positive pulse to the control terminal of a switch 72 thus establishing the path through this switch for a brief interval at the instant when the decoding operation carried out by the brightness decoder 56 has been completed. This switch 72 then acts to pass the decoded vision signal amplitude to a holding condenser 73 and to an image reproducer tube 74.

During the decoding operation it is desirable that the advance of the scanning beam of the reproducer tube 74 be halted and that, during such pause, its electron beam be blanked out. The duration of the pause is determined by the output of the control pulse generator 63. It is converted by a differentiator 75 to a pair of pulses of opposite polarities that are applied to an auxiliary sawtooth generator 76 whose output is additively combined in an adder 77 with the output of a line scan generator 78. The first differentiated pulse actuates the auxiliary generator 76 and the second one, $10^+$ clock pulse intervals later, deactivates it. As in the case of the transmitter apparatus the clock pulse counter 65 counts a preassigned number, for example 140 of the Multiple clock pulses actually reaching it, pausing in its count for a period $40^+$ Multiple clock pulse intervals each time the clock pulse path is broken by the application of the output of the control pulse generator 63 to the control terminal of the clock switch 64. At the conclusion of each such count it resets itself and delivers a pulse to actuate the line scan generator 78 that is proportioned to deliver an output that increases continuously in the fashion of a sawtooth wave and, the output having reached a preassigned magnitude, to return abruptly to its initial condition. In the absence of a pause, the output of the line scan generator 78 controls the horizontal deflection of the cathode beam of the tube 74 to advance steadily from one end of a scan line to the other. As above stated, however, it is required to introduce a pause into this advance each time a transition of the scene is to be reconstructed, and this pause is effected by combining with the output of the line scan generator 78 the output of the auxiliary sawtooth generator 76 proportioned to deliver, each time it is actuated by the differentiated output of the control pulse generator 63, a single sawtooth voltage having a rate of fall equal to the rise rate of the sawtooth voltage output of the line scan generator 78 and of 10+ Master clock pulses duration. The combination of the two waves in the adder 77 results in halting the advance of the cathode beam for the same period.

Application of the output of the control pulse generator to a blanking generator 79 acts to disable the cathode beam for the duration of the pause.

Scanning in the vertical dimension is controlled by a frame scan generator 80 under the joint control of the output of the clock pulse counter 65 and the output of a line counter 81 which in turn is controlled by the output of the clock pulse counter 65. The line counter is proportioned to count the same number, for example 200, of the output pulses of the clock pulse counter 65 as does the similarly designated unit in the transmitter apparatus, and thereupon to rest itself. As in the case of the transmitter apparatus the output wave of the frame scan generator 80 preferably has the form of a staircase, thus to advance the cathode beam of the tube 74 in stepwise fashion from each scanning line to the next and, after the scanning of all the lines has been completed, to return to its starting point.

The economies offered by the practice of the invention will be apparent from the following considerations.

If E be the total number of distinguishable picture elements or "dots" in a scanning line, and if the average density of transitions (ratio of number of dots containing transitions to dots without transitions) be denoted D, the total number of transitions is $T=DE$ and the number of dots containing no transitions is $(1-D)E$. If the scanning line be divided, beforehand, into runs of N dots each, the number of pulses required to count off the empty runs is $$P_1=\frac{(1-D)E}{N} \qquad (1)$$

and the number of permutation code pulses required to specify the locations of all the transitions within their respective runs is, after the addition of a marker pulse to each group, $$P_2=ED(n+1) \qquad (2)$$

where $$\left.\begin{array}{l} N=r^n \\ \text{or} \\ n=\log_r N \end{array}\right\} \qquad (3)$$

adding, $$P=P_1+P_2=\frac{(1-D)E}{N}+ED(n+1) \qquad (4)$$

or $$\frac{P}{E}=\frac{1-D}{N}+(n+1)D \qquad (5)$$

To discover whether an optimum relation holds between transition density and run-length (5) may be differentiated and the derivative set equal to zero. Thus $$\frac{d}{dn}\left(\frac{P}{E}\right)=0=-\frac{(1-D)}{N^2}+\frac{D}{N\ln r} \qquad (6)$$

For the binary code, the radix $r$ is 2, and $$\ln 2=0.69315 \qquad (7)$$

Hence, from (6)

$$0.69315=\frac{ND}{1-D} \qquad (8)$$

From which the optimum run-length N can at once be determined for any transition density D.

Analysis of large numbers of pictures of the sort here considered shows that their average transition density is $$D=0.15 \qquad (9)$$

For $N=2$, (8) gives $D=0.257$
For $N=4$, (8) gives $D=0.147$
For $N=8$, (8) gives $D=0.080$
For $N=16$, (8) gives $D=0.042$ and so on.

Evidently, of the foregoing possible values for N the second one, $N=4$, corresponds almost exactly to the empirically determined value of D. For $N=4$, $n=2$. Substitution of these values in (5) gives $$\frac{P}{E}=\frac{0.85}{4}+3\times0.15=0.66 \qquad (10)$$

This represents a substantial economy of pulses, as compared with a system in which the empty runs are coded, instead of being merely counted off. Moreover the disparity, and hence the economy, is still greater when the length of the run is 8 dots, for an average transition density D of 8 percent, and coded with three digits ($n=3$), and greater still for $N=16$, $n=4$, $D=4.2$ percent.

The formal solution of Equation 8 is of course unrestricted. Whatever the resulting formal magnitude of N, it is always of advantage to employ, for the maximum run-length, the nearest integral power of 2; i.e., to employ complete runs in contrast to incomplete ones.

The invention is not restricted to binary coding. Equations 5 and 6 apply equally to a code with any radix $r$. However, binary coding is preferred to ternary or N-ary coding for the reason that the successive magnitudes 2, 4, 8, etc. dots for the optimal lengths of the complete runs lie closer together than do the corresponding magnitudes for higher radices; e.g., for the ternary code, 3, 9, 27, etc. dots.

What is claimed is:

1. Image signal transmission apparatus which comprises means at a transmitter station for consecutively exploring the picture elements of a scene to derive indications of the locations in said scene of light value transitions, means for simultaneously grouping transition-free elements into consecutive runs of N elements each, means for transmitting to a receiver station a single code element to designate each entire run that is devoid of transitions, and means for also transmitting to said receiver station a code group of pulses to designate the location of a transition within the most recent run.

2. Image signal transmission apparatus which comprises means at a transmitter station for grouping the picture elements of a scene into adjacent runs of N adjacent elements each, means for consecutively exploring all of said elements to derive indications of the locations in said scene of light value transitions, means for transmitting to a receiver station a single code pulse to designate each entire run that is devoid of transitions, and means for also transmitting to said receiver station a code group of pulses specifying the location of a transition within the most recent run.

3. In combination with apparatus as defined in claim 2, means for interposing a marker pulse ahead of said code pulse group in said second channel.

4. In combination with apparatus as defined in claim 3, means operative on the completion of said transition locating code pulse group for generating another code pulse group representative of the light value of said scene immediately beyond said located transition.

5. Image signal transmission apparatus which comprises a Master clock generator proportioned to deliver pulses at a rate R, a Multiple clock generator synchronized with said Master clock generator and proportioned to deliver pulses at a rate NR, where N is an integral power of a code radix *r*, means under control of said Multiple clock generator for consecutively exploring the picture elements of a scene to derive indications of the locations in said scene of light value transitions, means under control of said Master clock generator for transmitting to a receiver station a single code pulse to designate each run of N consecutive picture elements that is devoid of transitions, and means likewise under control of said Master clock generator and operating isochronously therewith for also transmitting to said receiver station a code group of pulses to designate the location of a transition within the most recent run.

6. Image signal transmission apparatus which comprises a Master clock generator proportioned to deliver pulses at a rate R, a Multiple clock generator synchronized with said Master clock generator and proportioned to deliver pulses at a rate NR, where $N=r^n$, $n$ is an integer and $r$ is the radix of a code, means under control of said Multiple clock generator for consecutively exploring the picture elements of a scene, normally at a rate NR elements per second, means under control of said Maser clock generator for transmitting to a receiver station a single code pulse signaling each run of N consecutive picture elements that is devoid of brightness transitions, means operative in response to passage of said exploring means over a transition in the light value of said scene for causing said exploring means to pause for a number $m+n+1$ Master clock generator pulses, means operative during said pause for translating the location, within the most recent run, of the most recent light value transition of the scene into a code word of $n$ digits, means operative during said pause for translating the light value of the scene immediately following said transition into a code word of $m$ digits, means for generating a marker pulse signifying that the most recent run contains a light value transition, and means under control of said Master clock generator for transmitting, at the rate R, said marker pulse, the pulses of said $n$ digit code word, and the pulses of said $m$ digit code word.

7. Image signal transmission apparatus which comprises a Master clock generator proportioned to deliver pulses at a rate R, a Multiple clock generator synchronized with said Master clock generator and proportioned to deliver pulses at a rate NR, where $N=r^n$, $n$ is an integer and $r$ is the radix of a code, means under control of said Multiple clock generator for consecutively exploring the picture elements of a scene, normally at a rate NR elements per second, means under control of said Master clock generator for transmitting to a receiver station a single code pulse signaling each run of N consecutive picture elements that is devoid of brightness transitions, means operative in response to passage of said exploring means over a transition in the light value of said scene for initiating a pause in the advance of said exploring means, means operative during said pause for translating the location, within the most recent run, of the most recent light value transition of the scene into a code word of $n$ digits, means operative during said pause for translating the light value of the scene immediately following said transition into a code word of $m$ digits, means for generating a marker pulse signifying that the most recent run contains a light value transition, means under control of said Master clock generator for transmitting, at the rate R, said marker pulse, the $n$ pulses of said $n$ digit code word, and the $m$ pulses of said $m$ digit code word and means, likewise under control of said Master clock generator, for thereupon terminating said pause.

8. In combination with image signal transmission apparatus comprising means at a transmitter station for consecutively exploring the picture elements to a scene to derive indications of the locations in said scene of light value transitions and other indications of the magnitudes of said transitions, means for translating each of said first indictaions into a code word of $n$ digits, means for translating each of said other indications into a code word of $m$ digits, and means for transmitting both of said code words to a receiver station, image reconstruction apparatus at said receiver station which comprises a position decoder and a brightness decoder, means for routing each incoming $n$ digit code word to said position decoder, means for routing each incoming $m$ digit code word to said brightness decoder, an image reproducer, a normally disabled conduction path interconnecting the output point of said brightness decoder with said reproducer, and means for enabling said conduction path under control of the output of said position decoder.

9. Apparatus as defined in claim 8 wherein said position decoder comprises means for converting each $n$ digit code word into an output condition having one of $2^n$ different amplitudes and a pulse counter proportioned to deliver an output having the waveform of a staircase of $N=2^n$ treads, means for additively combining the staircase wave with said counter output, a trigger circuit having a tripping threshold slightly in excess of the highest tread of said staircase wave, and means for applying said combination to said trigger circuit, thereby to trip it at an instant which, on the time scale, is the decoded counterpart of said position code word.

References Cited in the file of this patent

UNITED STATES PATENTS

| | | |
|---|---|---|
| 2,115,894 | Watson | May 3, 1938 |
| 2,625,604 | Edson | Jan. 13, 1953 |
| 2,725,425 | Sziklai | Nov. 29, 1955 |